United States Patent [19]

Yamaoka et al.

[11] Patent Number: 4,494,113

[45] Date of Patent: Jan. 15, 1985

[54] METHOD AND APPARATUS FOR SELF-CONTROL IN DISTRIBUTED PRIORITY COLLISION

[75] Inventors: Hiromasa Yamaoka; Yuzaburo Iwasa; Kazuhisa Matunaga, all of Hitachi, Japan

[73] Assignee: Hitachi, Ltd., Tokyo, Japan

[21] Appl. No.: 356,891

[22] Filed: Mar. 10, 1982

[30] Foreign Application Priority Data

Mar. 13, 1981 [JP] Japan .................. 56-35378
Jun. 3, 1981 [JP] Japan .................. 56-84377

[51] Int. Cl.³ .............................................. H04Q 9/00
[52] U.S. Cl. .................................... 340/825.5; 370/85
[58] Field of Search ............. 340/825.5, 825.51; 370/86, 85; 178/3

[56] References Cited

U.S. PATENT DOCUMENTS

| | | | |
|---|---|---|---|
| 4,232,294 | 11/1980 | Burke et al. | 340/825.5 |
| 4,359,731 | 11/1982 | Beauford et al. | 340/825.51 |
| 4,379,294 | 4/1983 | Sutherland et al. | 340/825.5 |

*Primary Examiner*—Donald J. Yusko
*Attorney, Agent, or Firm*—Antonelli, Terry & Wands

[57] ABSTRACT

Method and apparatus for controlling collision in a system having a common unit shared by a plurality of devices are disclosed. More particularly, method and apparatus for controlling priority collision in a system where a computer is shared by a plurality of terminal devices or a memory unit is shared by a plurality of computers are disclosed. Continued time period of non-access to the common unit by any of the plurality of devices is measured in each of the plurality of devices, and when the measured time period coincides with one of preset time periods inherently assigned to the respective devices, the associated one of the plurality of devices is permitted to access to the common unit on the condition that the common unit is not busy and that one device issues an access request to the common unit. In addition to ordinary access request to the common unit, a priority interruption access request may be issued.

9 Claims, 20 Drawing Figures

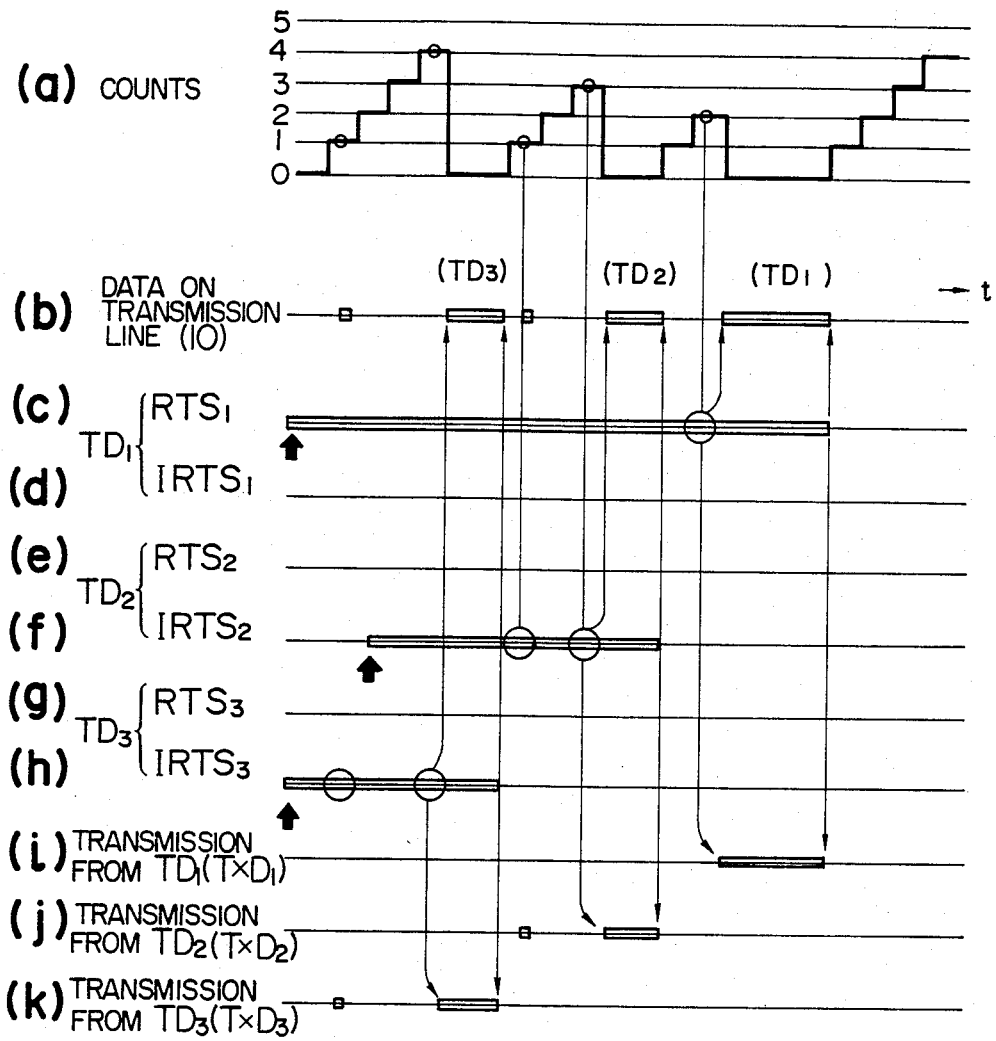
FIG. 7
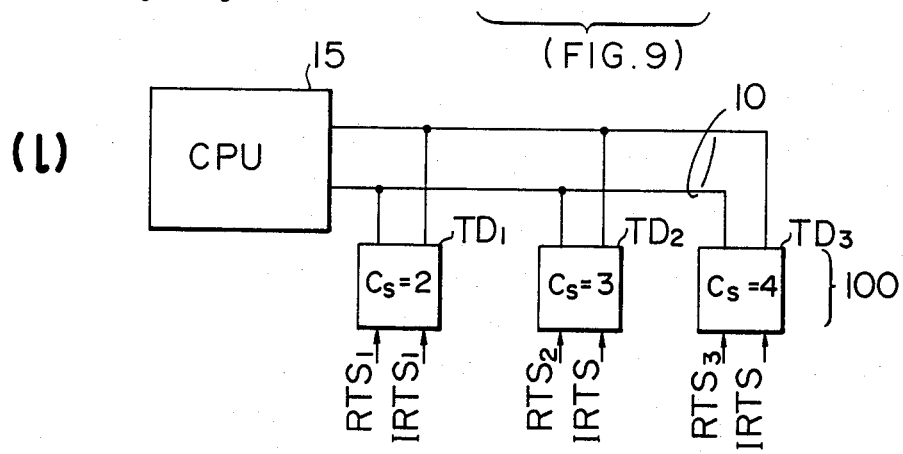

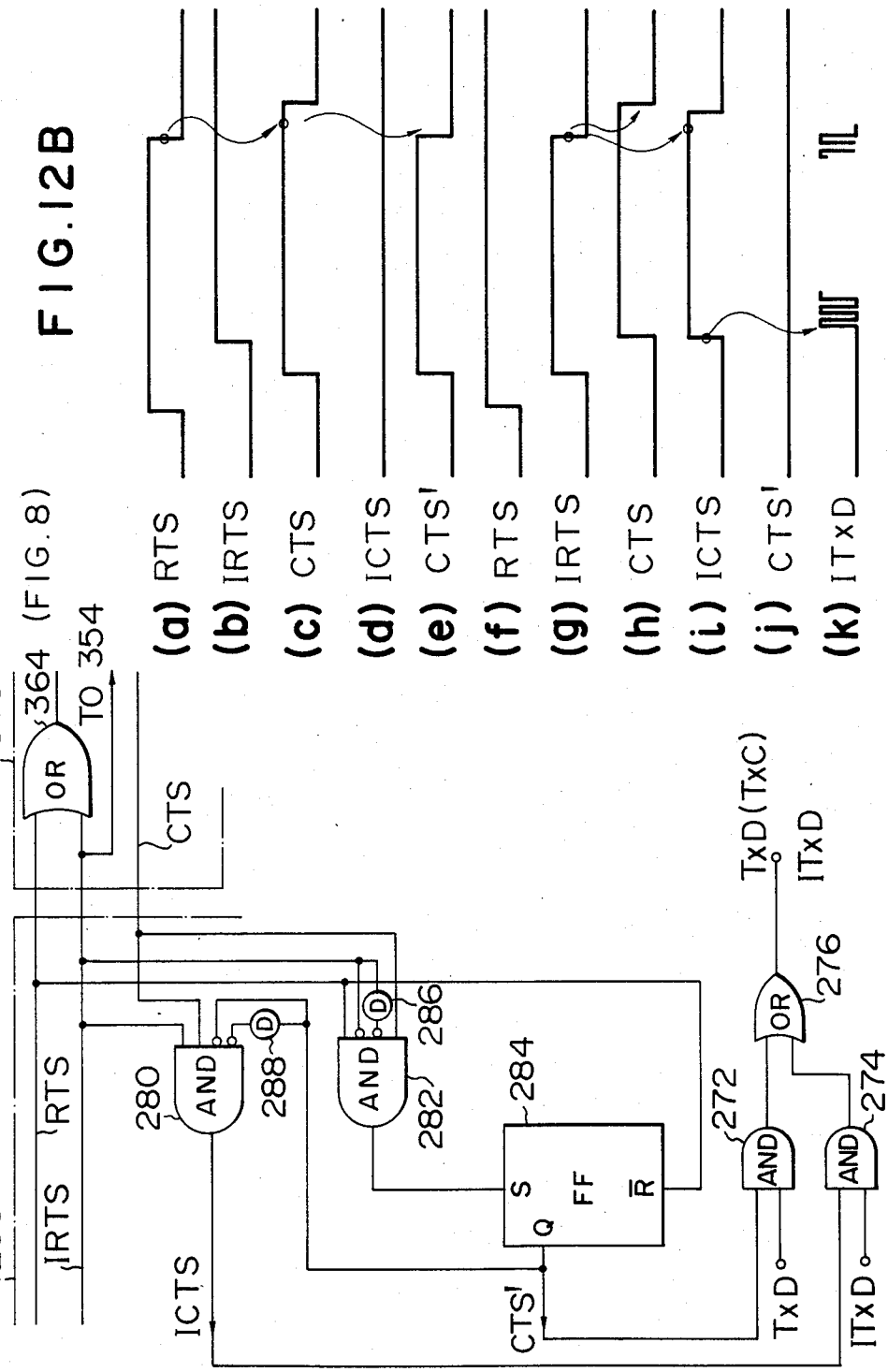

F I G. 13A
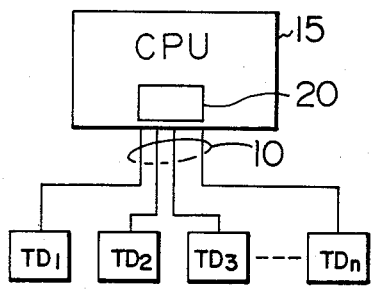
F I G. 13B
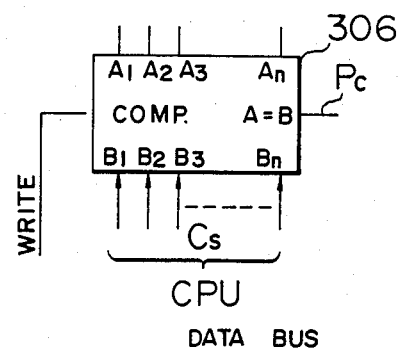
F I G. 13C
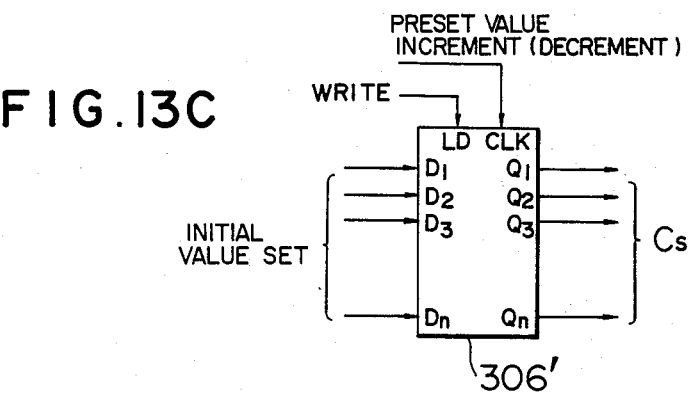
F I G. 13D
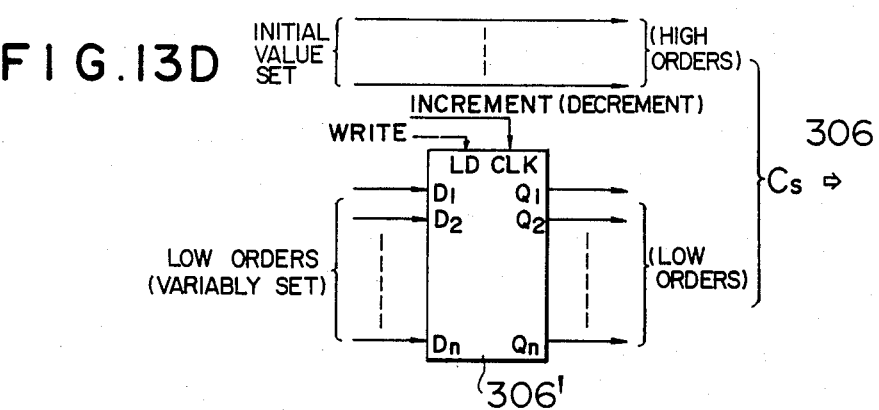

METHOD AND APPARATUS FOR SELF-CONTROL IN DISTRIBUTED PRIORITY COLLISION

BACKGROUND OF THE INVENTION

1. Field of the Invention

The present invention relates to method and apparatus for self-control in distributed priority collision wherein a plurality of units sharing a common unit are self controlled to prevent collision of access requests from the plurality of units.

For example, a system in which information is transmitted by a central processing unit and a plurality of terminal devices through a common bus line and a system in which a plurality of computers share a common memory are applicable. While such a system usually has a common bus line, the present invention is not limited to such a system. For example, the present invention is applicable to a system in which a common unit and a plurality of terminal devices are connected via respective information transmission lines but the common unit cannot be simultaneously accessed by the plurality of terminal devices.

2. Description of the Prior Art

A problem of collision is usually encountered when a common unit such as a common central processing unit is shared by a plurality of terminal devices. Many methods to resolve the above problem have been proposed.

In one method, a priority control unit is provided to control access requests from the plurality of terminal devices. The control unit receives access request signals from the plurality of terminal devices and issues access grant signals to the plurality of terminal devices in accordance with a predetermined priority order. Only the terminal device which received the access grant signal can access to the common unit (e.g. central processing unit). However, the priority control unit and signal lines for the access request signals and the access grant signals are additionally needed, and if an error occurs in the priority control unit, all of the plurality of terminal devices are affected.

In another method, a plurality of terminal devices are connected in a closed loop and a right to access a central processing unit is sequentially shifted. If a terminal device issues the access request to the central processing unit when that terminal device possesses the access right, it is permitted to access the central processing unit. This method is called a round robin method or a daisy chain method. In this method, however, if failure occurs in one of the terminal devices, all of the downstream terminal devices (and hence all terminal devices) are affected.

Japanese Laid-Open Patent Application No. 55-23643 (laid-open on Feb. 20, 1980) discloses a method in which specific addresses are assigned to a plurality of terminal devices and an inhibit signal for inhibiting the send-out of data from other terminal devices is sent out to an inhibit line at a timing associated with the addresses. However, this method needs the inhibit line in addition to the data lines.

U.S. Pat. No. 4,063,220 entitled "Multipoint Data Communication System with Collision Detection" issued on Dec. 13, 1977 discloses a method in which when terminal devices request data transmission, they are allowed to transmit data and a collision detector detects any collision, and a time interval to the next transmission is determined by a random number generator. This method is characterized by handling the collision after the terminal devices were allowed to transmit the data.

SUMMARY OF THE INVENTION

It is an object of the present invention to provide method and apparatus of self-control of priority in a system in which a common unit is shared by a plurality of units, which prevent collision to the common unit without using a priority controller.

It is another object of the present invention to achieve priority control in a system in which the common unit and the plurality of units are connected via only data transmission lines and no inhibit line which is used in the prior art system is required.

In order to achieve the above objects, in accordance with one feature of the present invention, the data transmission lines and the inhibit lines are shared.

According to another feature of the present invention, an elapsed time after the end of data transmission using the data transmission lines is measured and if the elapsed time is equal to a present time assigned to one of the plurality of terminal devices and that one terminal device issues a transmission request signal, the transmission from that one terminal device to the common unit is permitted and the transmission of the other terminal devices is inhibited by the transmission line while that one terminal devices is transmitting data.

According to a further feature of the present invention, the plurality of terminal devices self-control to prevent the collision to the common unit.

According to a further feature of the present invention, the collision is prevented by assigning a specific time period to the respective terminal devices. The term specific time period herein used means an elapsed time from a time point at which all of the plurality of terminal devices no longer access the common unit. Since the elapsed time is counted for each transmission time, error is not accumulated.

According to a still further feature of the present invention, the plurality of terminal devices generate clock signals and count the elapsed times of the respective terminal devices based on the clock signals. Accordingly, it is not necessary to supply a common clock signal to the terminal devices.

BRIEF DESCRIPTION OF THE DRAWINGS

FIG. 7 shows a time chart for explaining the operation of priority interruption control.

FIGS. 12A and 12B show a circuit diagram of a coupling section of the transmission-right controller and the transmission controller and a time chart for signals thereof.

FIGS. 13A to 13D show modifications of time setting means for deciding priority order time period.

DETAILED DESCRIPTION OF THE PREFERRED EMBODIMENTS

Figure 1A:
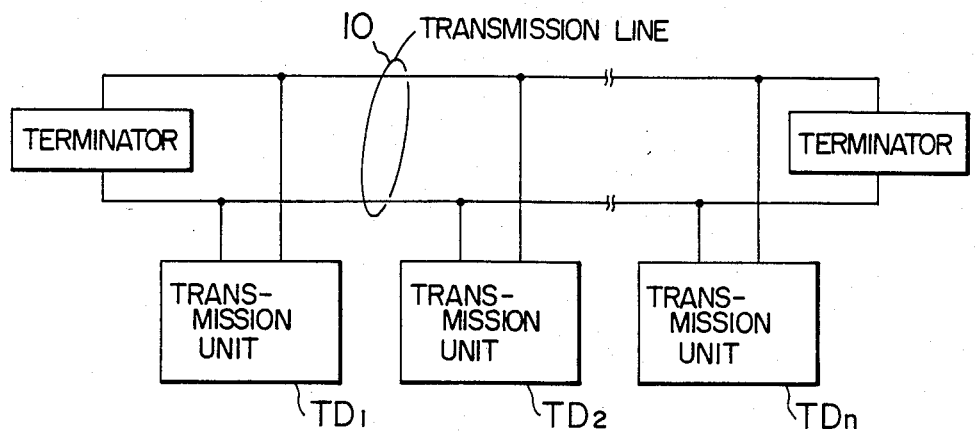
FIGS. 1A and 1B show system configuration diagrams of the present invention.
Figure 1B:
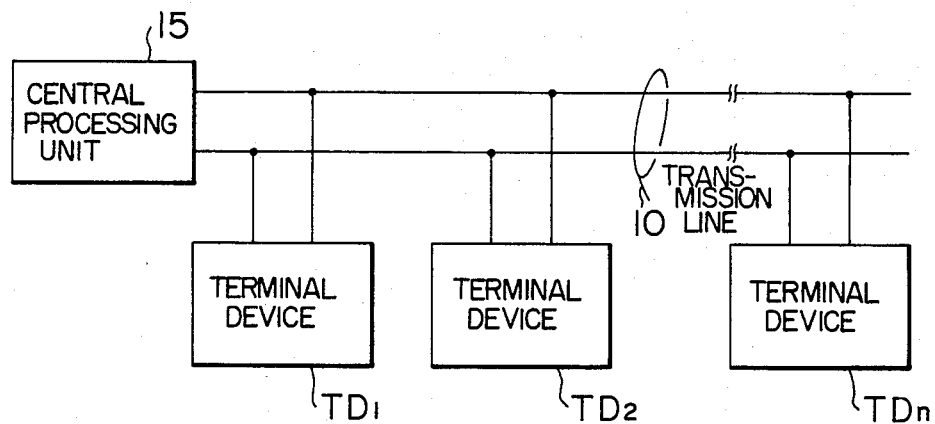

FIGS. 1A and 1B show an overall configuration of the present invention. $TD_1$, $TD_2$,—$TD_n$ denote transmission units which are coupled to a transmission line 10. In FIG. 1A, the transmission line 10 is terminated by terminators and the transmission line 10 is a common unit, and the transmission units transmit data with each other through the common transmission line 10.

In FIG. 1B, terminal devices $TD_1$-$TD_n$ share a central processing unit 15. In this case, the common unit comprises the central processing unit 15 and the transmission line 10. In any case, the priority control is effected to prevent collision of information transmission on the transmission line or the central processing unit through the transmission line.

It should be understood that the common unit is not limited to the central processing unit but it may be a memory unit shared by a plurality of computers, or a master station or a central supervising unit which supervises remote slave stations in a remote supervising control system.

While terms transmission units and terminal devices are used in FIGS. 1A and 1B, the term terminal devices $TD_1$-$TD_n$ is hereinafter used indistinctively to represent both.

Legend of symbols used in the following description is shown below.

LEGEND

Figure 2:
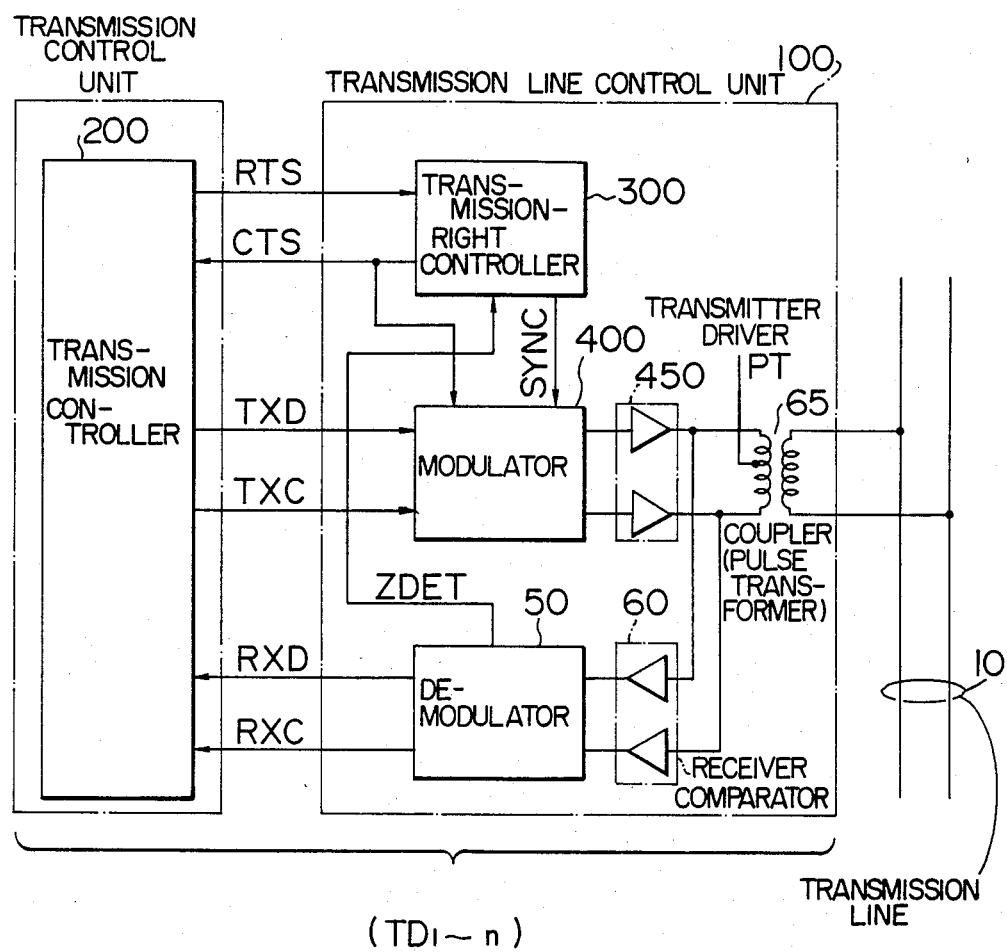
FIG. 2 shows a schematic configuration of terminal device $TD_1$–$TD_n$ of the present invention.

RTS: Request to send signal
CTS: Clear to send signal
TXD: Transmit data signal
TXC: Transmitter clock signal
RXD: Receiver data signal
RXC: Receiver clock signal
ZDET: Zero detect signal
SYNC: Synchronizing pulse
GND: Ground
VCC: Collector voltage
AND: AND gate
OR: OR gate
FF: Flip-flop
TRS: Transistor
PT: Pulse transformer
OA: Operational amplifier
CLK: Clock signal
OSC: Oscillator
COMP: Comparater
TD: Terminal device
DIV: Divider
IRTS: Interrupt request to send output
ITXD: Interrupt transmit data output FIG. 2 shows a block diagram of the present invention. Each of the terminal devices $TD_1$-$TD_n$ shown in FIGS. 1A and 1B comprises a transmission line control unit 100 and a transmission control unit. The transmission control unit differs from type to type of the terminal device but detailed description thereof is omitted here because it is not directly related to the present invention. The transmission control unit may be a computer or a slave station in a remote supervising control system, and it is not limited to a particular one. It issues an RTS to transmit data TXD and TXC. The present invention is characterized by the transmission line control unit 100.

The transmission line control unit 100 comprises a transmission-right controller 300, a modulator 400, a transmitter driver 450, a demodulator 50, a receiver comparator 60 and a coupler 65 (which in many cases is a pulse transformer).

Figure 3A:
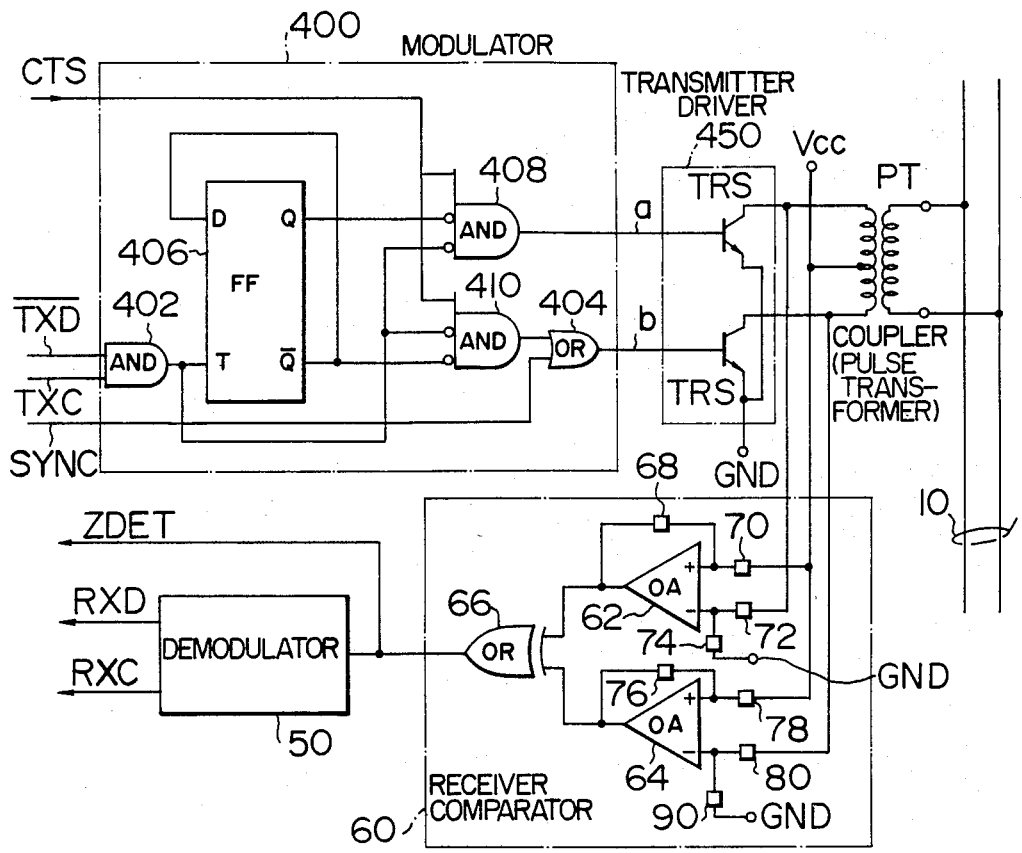
FIG. 3A shows circuit diagrams of a modulator, a transmitter driver and a receiver comparator shown in FIG. 2.

FIG. 3A shows a circuit diagram of the modulator 400, the transmitter driver 450 and the receiver comparator 60. The demodulator 50 may be any demodulator so long as it can separate a received signal to RXD and RXC or can discriminate the received signal without error. Detailed description thereof is omitted here.

Figure 3B:
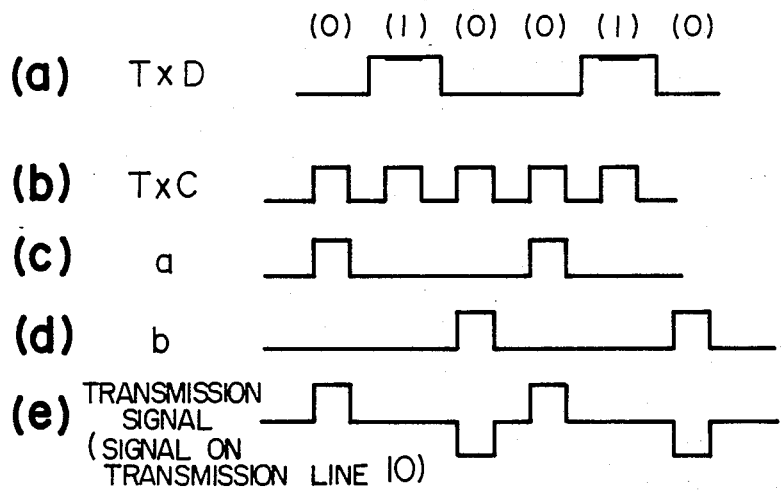
FIG. 3B shows a time chart for major signals in FIG. 3A.

The modulator 400 comprises AND gates 402, 408, 410, an OR gate 404 and a flip-flop 406. If the transmission-right controller 300 issues a CTS signal, the transmission controller 200 is allowed to transmit data (TXD, TXC). FIG. 3B shows a time chart of the various signals. The transmitter driver 450 comprising transistors provides a bipolar circuit system. The transmission signal on the transmission line 10 is shown in FIG. 3B(e).

The receiver comparator 60 comprises operational amplifiers 62, 64, an OR gate 66 and resistors 68-90. When the transmission line 10 is occupied by other terminal device, the receiver comparator 60 of one terminal device detects it by ZDET through a PT. When said one terminal device is transmitting a signal, it is also detected by the ZDET. The transmission-right controller 300 does not provide the CTS signal or transmission-permit signal during detection of ZDET signal even if the request to send or RTS signal is received. However, when said one terminal device is already transmitting the signal, the transmission of the signal is allowed even if the ZDET is detected. This will be further explained later.

Figure 4:
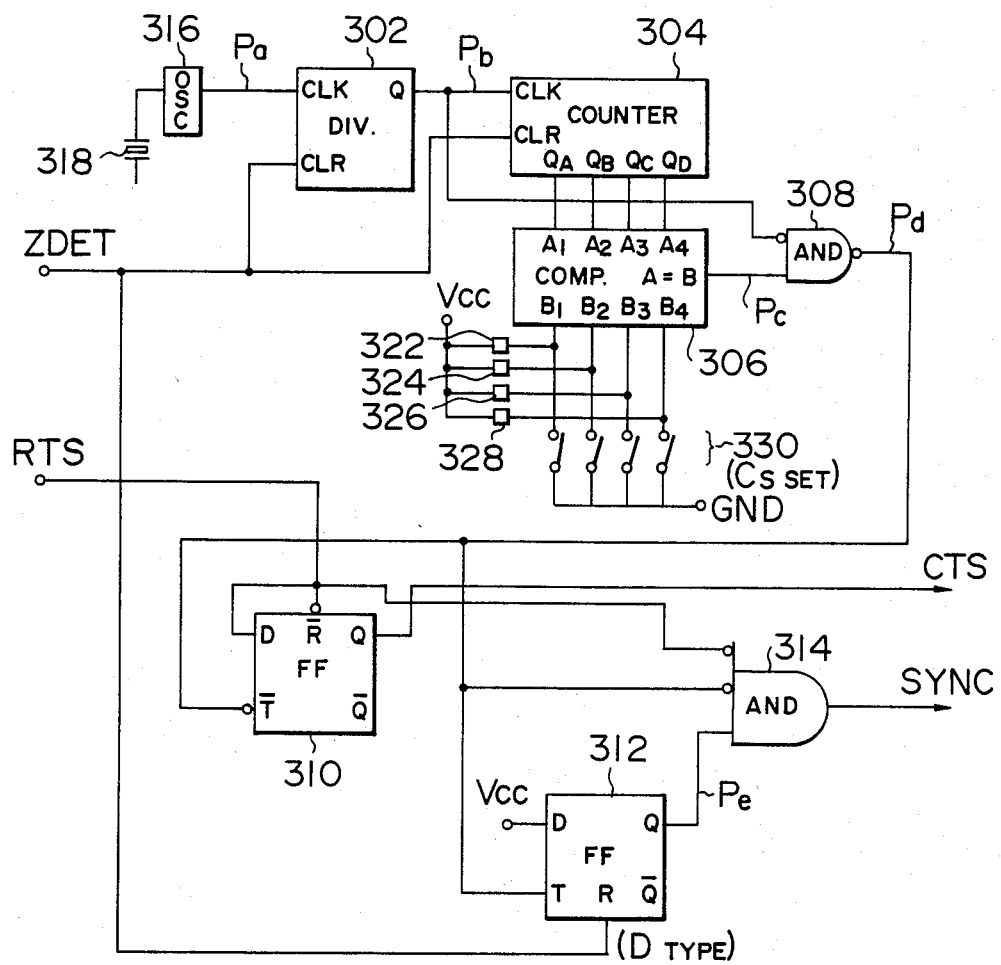
FIG. 4 shows a circuit diagram of a transmission-right controller 300 shown in FIG. 2.
Figure 5:
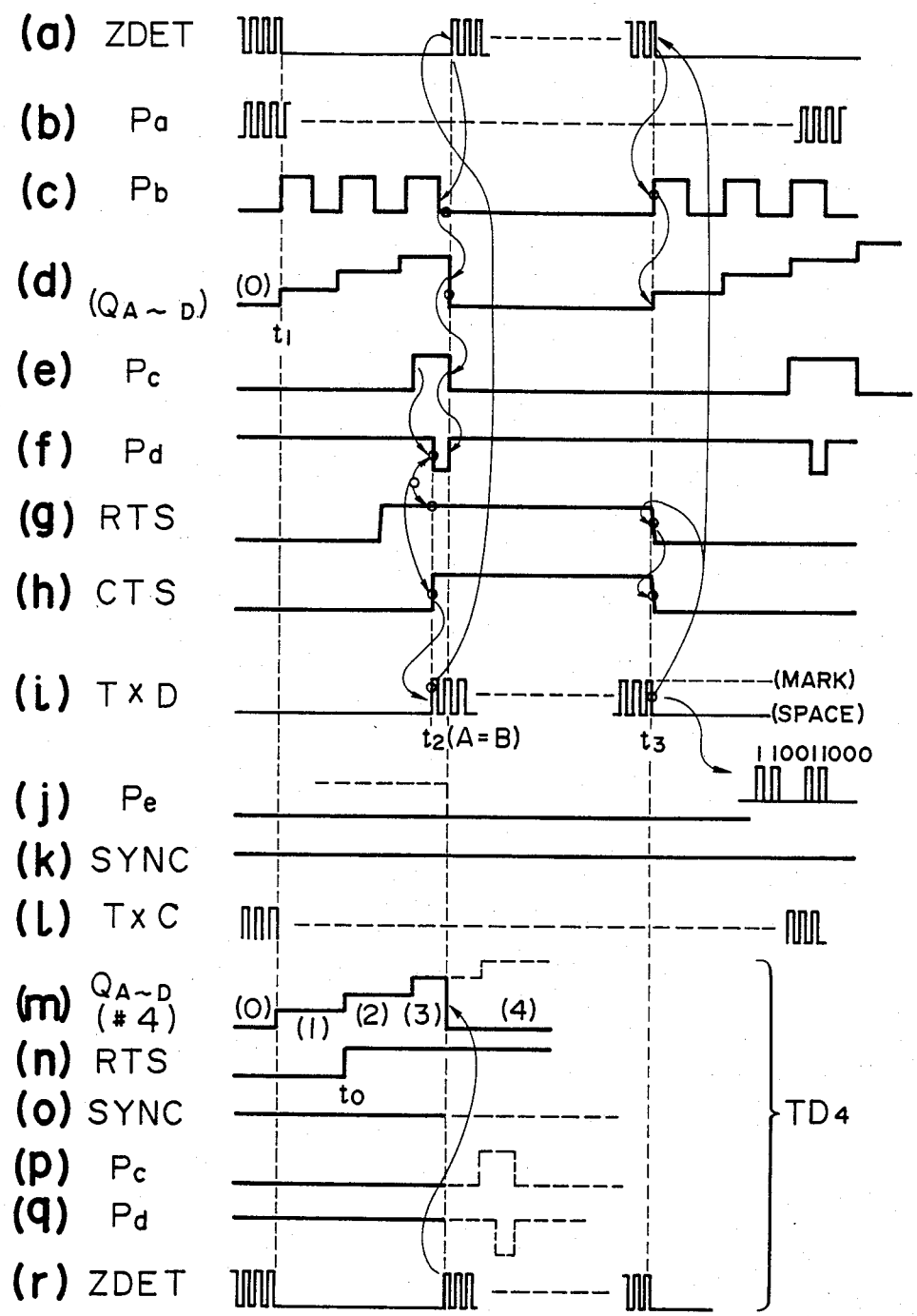
FIG. 5 shows a time chart for signals in the circuit of FIG 4.
Figure 6:
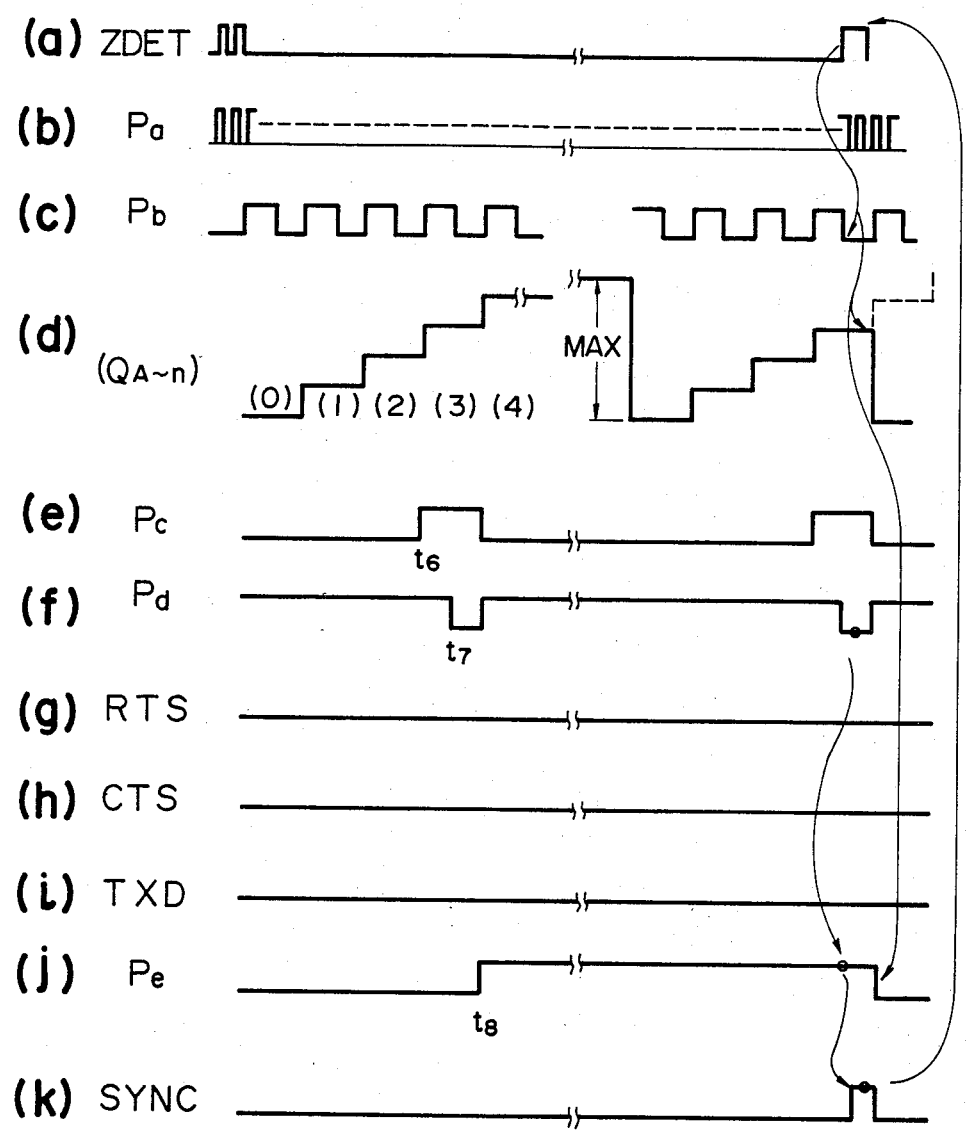
FIG. 6 shows a time chart for explaining the operation of forced synchronization for a plurality of terminal devices.

FIG. 4 shows a detailed circuit diagram of the transmission-right controller 300 shown in FIG. 2. It comprises flip-flops 310, 312, a frequency divider 302, a counter 304, a comparator 306 and AND circuits 308, 314. Numeral 318 denotes an oscillating element (e.g. crystal) and an oscillator (OSC) 316 oscillates at a frequency of the oscillating element 318. FIG. 5 shows a time chart of various signals. A signal Pa from the output of the oscillator OSC 316 is a basic clock signal as shown in FIG. 5(b). One cycle period of the pulse is approximately 4 microseconds which depends on the transmitter clock or TXC signal, and an output signal Pb of the frequency divider has a waveform shown in FIG. 5(c). One cycle period of the frequency-divided signal pulse is approximately 128 microseconds which is several tens times the TXC period. The ZDET signal shown in FIG. 5(a) designate the presence of data on the transmission line 10. Let us assume that the transmission line 10 becomes free (mark idle) at a time $t_1$. The terminal devices simultaneously start to count from the time $t_1$. FIG. 5(a)–(e) shows the time chart for $TD_3$. The counting is continued until the count of the signals Pb in the counter 304 reaches a present count $C_s$ preset in the comparator 306 by switching means 330. The outputs $Q_A-Q_D$ of the counter 304 are shown in FIG. 5(d). Assuming that the preset count $C_s$ of $TD_3$ is 3, when the content of the counter 304 reaches 3, the signal $P_c$ assumes a high level and a signal $P_d$ assumes a low level with a certain time delay. By an AND function of the low level of Pd and the high level of RTS (that is, the transmission request signal is present), CTS assumes a high level (FIG. 5(e), (f), (g), (h)). By the high level of CTS, the transmission control unit starts to transmit the signal TXD. In response to TXD, the receiver comparator causes ZDET to assume high level (FIG. 5(a)) so that the signal Pb assumes low level (FIG. 5(c)) and the counter 304 is reset (FIG. 5(d)). During the transmission of TXD, the counter 304 is not counted up.

At a time $t_3$, when the transmission of TXD terminates, RTS and CTS are at low level. ZDET also assumes low level and Pb is again applied to the counter 304, which starts to count.

The operation of the terminal device $TD_4$ when RTS of $TD_4$ has been issued at the same time as RTS of $TD_3$ is illustrated in FIG. 5(m)-(s). The RTS of $TD_4$ is issued (FIG. 5(o)) prior to the issuance of the RTS of $TD_3$ (FIG. 5(g)). When ZDET in $TD_4$ is detected, the counter is reset so that the waveforms shown in dotted lines in FIG. 5(m)-(r) do not appear (assuming that Cs of $TD_4$ is 4). That is, even if RTS of $TD_4$ is issued prior to RTS of $TD_3$, $TD_3$ has a higher priority right to transmit the signal (or occupy the common unit), because $Cs_3 < Cs_4$, namely $TD_3$ has a higher priority level than $TD_4$. In the present embodiment, the terminal device having a shorter elapsed time period from the time point at which all of the terminal devices cease to access the common unit has a higher priority of transmission-right.

When the terminal device is transmitting the signal, the transmission of the signal by that terminal device is not inhibited by the ZDET signal of its own. Let us assume that $TD_3$ has acquired the transmission-right and started to transmit TXD as shown in FIG. 5(i). As ZDET of $TD_3$ is detected, Pb and Pc are at low level, and Pd changes to high level. However, since RTS remains high level and CTS is not reset but maintains high level, the transmission of the signal by $TD_3$ is not inhibited.

FIG. 6(a)-(k) show waveforms in the forced synchronization. When none of the terminal devices issues RTS, differences of periods of the clock signals of the respective terminal devices accumulate. Accordingly, it is preferable to generate a SYNC signal at a certain timing to zero-adjust the counter. In the illustrated example, the SYNC signal is generated when it is detected that the respective terminal devices did not issue RTS. The terminal device $TD_3$ is considered. Cs is set to 3. Signal Pc changes at time $t_6$ and signal Pd changes at time $t_7$ because of absence of RTS but signals TXD and CTS do not change. Signal Pe changes to high level at time $t_8$. In the next cycle, when the count reaches $C_s=3$, SYNC signal is issued if Pd and RTS are low level and Pe is high level. Since the SYNC signal is sent out to the transmission line 10 through the OR circuit 404 shown in FIG. 3A, the receiver comparator detects it as ZDET to forcibly reset the counter. Since this reset is detected by the receiver comparators of all terminal devices connected to the transmission line 10 by the SYNC signal issued from $TD_3$, the counters of the respective terminal devices are reset simultaneously. In this manner, an operation equivalent to forced synchronization or zero adjustment is effected. If the synchronization of the clock signals of the respective terminal devices is maintained by any other means, the forced synchronizing means is not necessary.

The interruption priority control in the present invention is now explained. FIG. 7 shows a time chart of the operation. It is assumed that three terminal devices are included and $Cs=2$ is set in $TD_1$, $C_s=3$ is set in $TD_2$ and $C_s=4$ is set in $TD_3$. An overall configuration is shown in FIG. 7(l). FIG. 7(a) represents counts. Thick arrows indicate time points at which RTS or IRTS are issued. In the present embodiment, $Cs=1$ is assigned to the priority interruption.

Let us assume that $RTS_1$ is issued in $TD_1$ and $IRTS_3$ is issued in $TD_3$, and after a certain time period, $IRTS_2$ is issued in $TD_2$. Terminal devices which have issued IRTS can transmit data prior to terminal devices issuing $RTS_1$, and the IRTS's are processed in the priority order of RTS's as shown in FIG. 7 (a)-(k). When the count of the counter reaches 2 and $RTS_1$ is present, the signal is transmitted from $TD_3$ because $IRTS_3$ is present, and then the signal from $TD_2$ which issues $IRTS_2$ is transmitted, and finally the signal from $TD_1$ which issues $RTS_1$ is transmitted.

Figure 8:
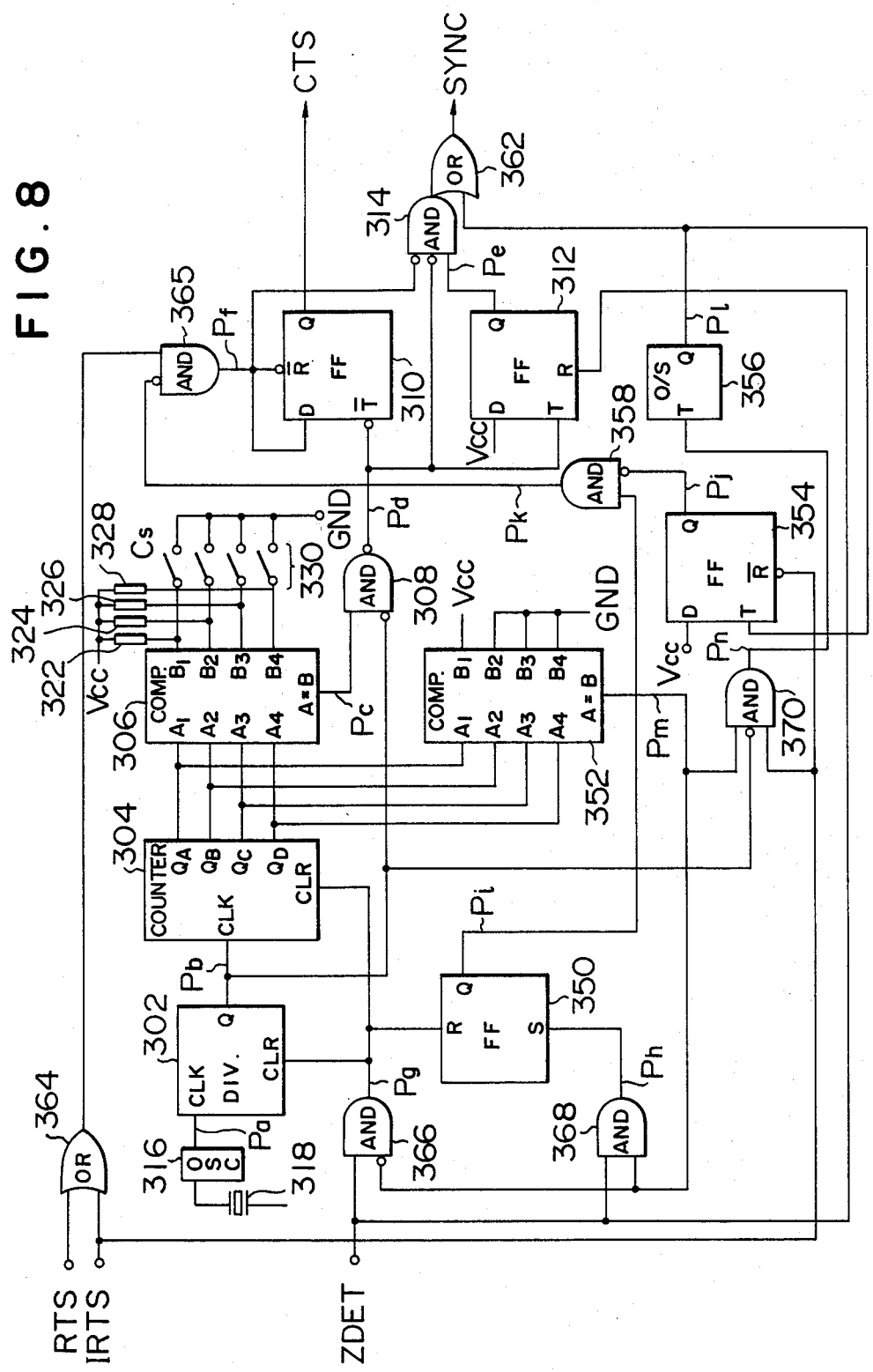
FIG. 8 shows a circuit diagram of a transmission-right controller with priority interruption control.
Figure 9:
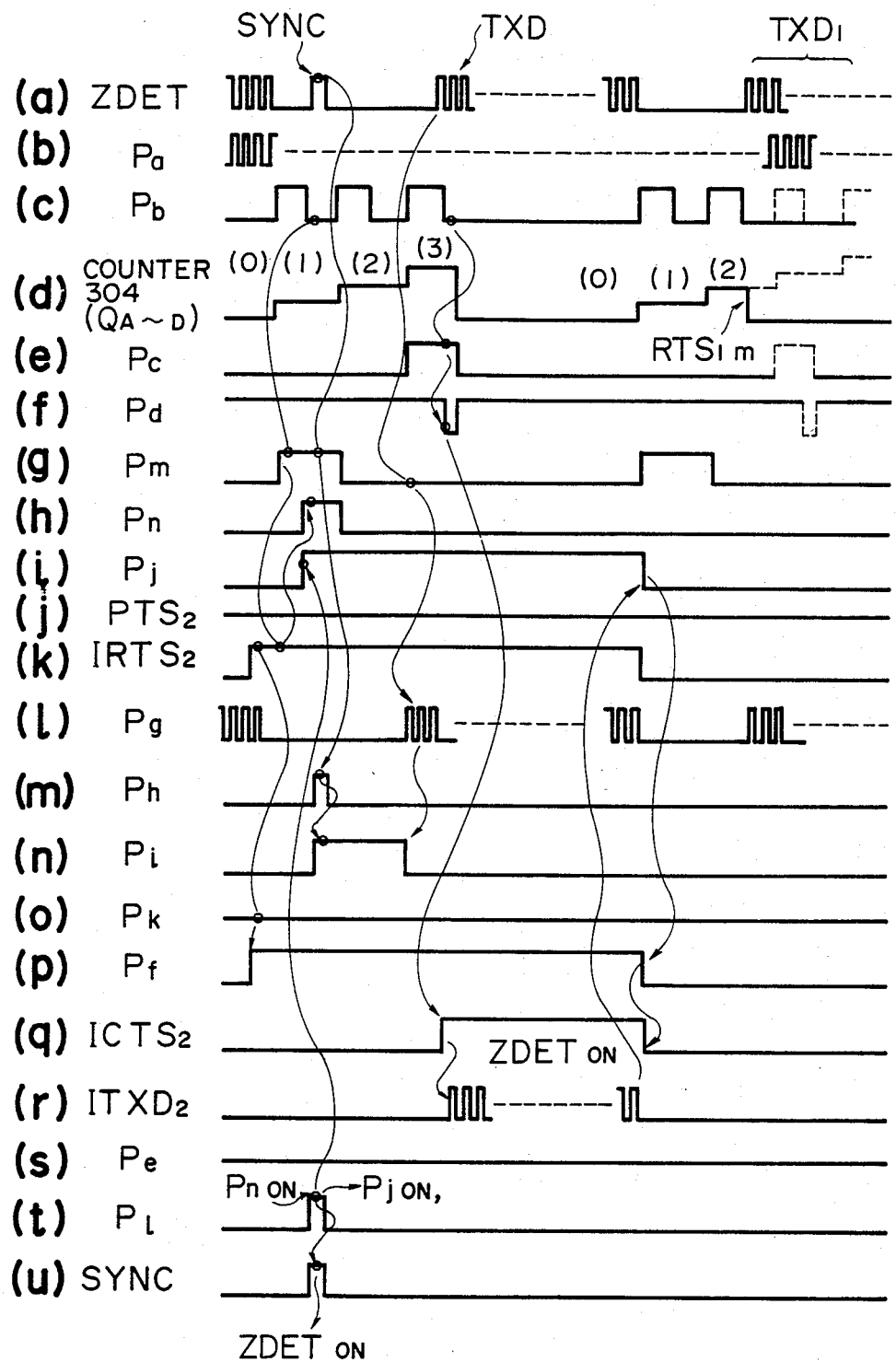
FIG. 9 shows a time chart for signals in the circuit of FIG. 8.
Figure 10A:
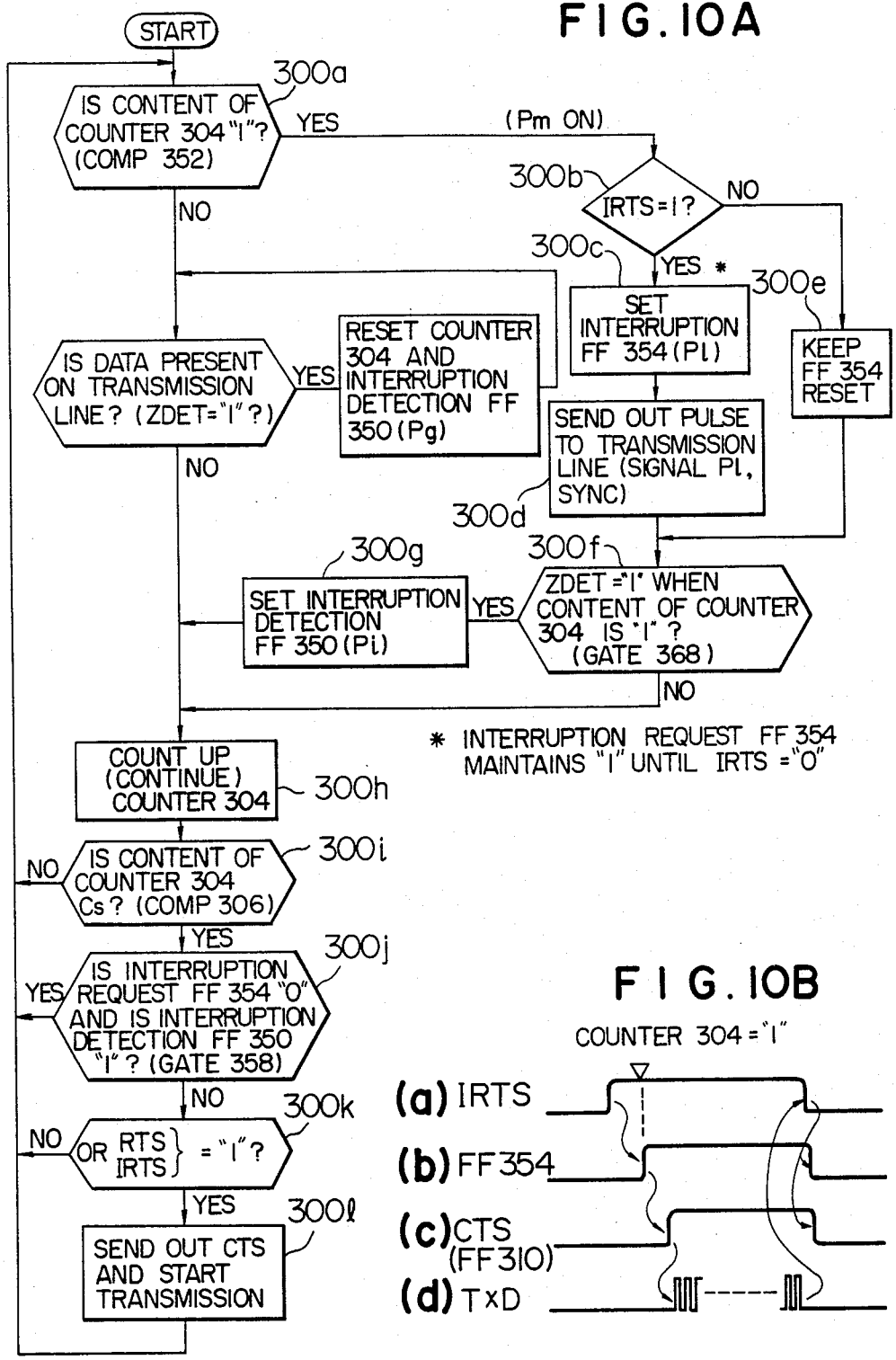
FIGS. 10A and 10B show a flow chart and a time chart for explaining the operation of FIG. 8.
Figure 10B:
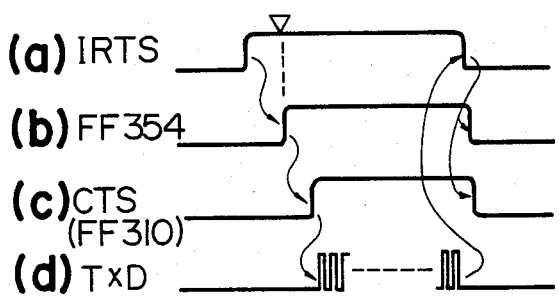

FIG. 8 shows a concrete circuit diagram of the transmission-right controller with the priority interruption control function described above. The like elements to those shown in FIG. 4 are designated by the like reference numerals. Added to the elements shown in FIG. 4 are OR circuits 364 and 362, AND circuits 366, 368, 370, 358 and 364, flip-flops 350 and 354, a one-shot multivibrator 356 and a comparator 352. FIGS. 9(a)-(u) show a time chart of the signals in FIG. 8, and FIGS. 10A and 10B show flow charts explaining the operation. FIG. 9 illustrates the transition from $TD_2$ to $TD_1$.

Referring to FIGS. 10A and 10B, the counter 304 counts an elapsed time from the end of the signal transmission on the transmission line 10. At a step 300a of FIG. 10A, the comparator 352 checks if the count of the counter 304 is "1". If it is "1", it is checked if IRTS of the associated terminal device is on ("1"), and if it is "1", it is determined that the interruption request has been issued (step 300b). When Pm is at high level and Pb is at low level, FF 354 is set if IRTS goes to "1". This is shown in step 300c. Signal SYNC is generated by signal Pl (step 300d). If IRTS is not "1" (NO) at step 300b, FF 354 remains reset (step 300e).

In order to further explain the step 300c, time charts of IRTS, CTS, FF 354 and TXD are shown in FIGS. 10B (a)-(d).

In step 300f, it is checked if the count of the counter 304 is "1" and ZDET is "1". If ZDET is "1", the interruption detection FF 350 is set (step 300g), and if ZDET is not "1", the counter 304 continues to count up (step 300h).

As the counter continues to count up, it is checked if the count has reached the preset count Cs of the associated terminal device (COMP 306 in step 300i). When the comparator 306 detects $A=B$ (Cs), it is checked if the output of the interruption request FF 354 is "0" and the output of the interruption detection FF 350 is "1" (step 300j). If the result is "No", it is checked if RTS or IRTS is "1" (step 300k). If RTS or IRTS is "1", CTS is issued to transmit the signal from the associated terminal device (300l). When the end of the signal transmission is detected, steps 300a-300l shown in FIG. 10A are repeated.

Figure 11:
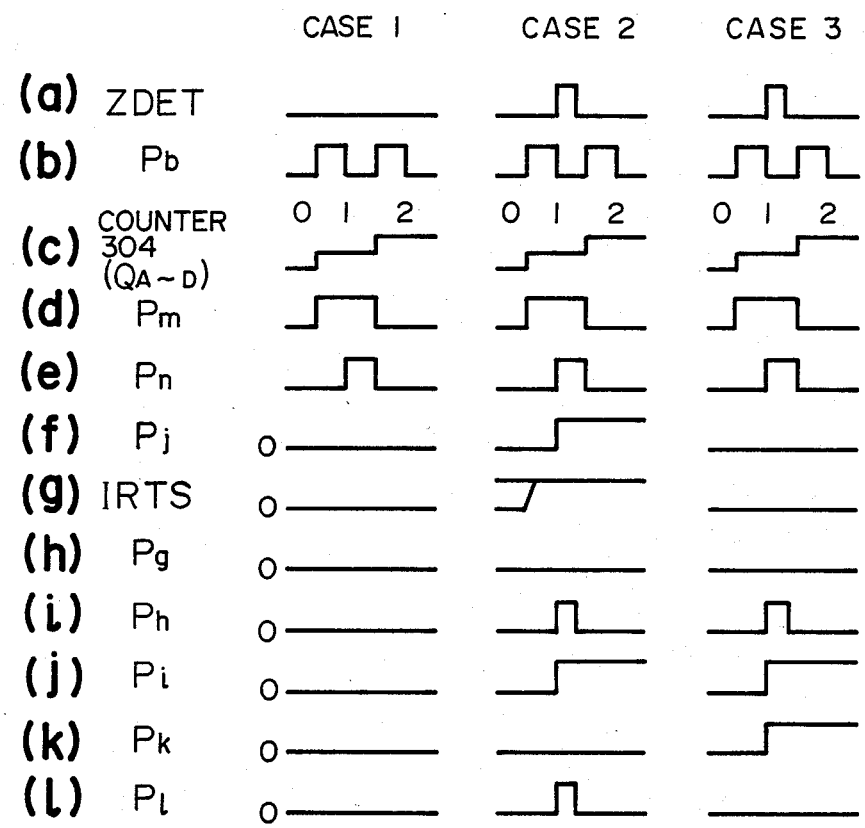
FIG. 11 shows a time chart for major signals in three typical cases of priority interruption control.

FIG. 11 shows a time chart of major signals in three typical cases. In case 1, neither the terminal device under consideration nor other terminal devices issue IRTS. In case 2, the terminal device under consideration issues IRTS and other terminal devices do not issue IRTS (or issue IRTS). In case 3, the terminal device under consideration does not issue IRTS and other terminal device issues IRTS. FIGS. 11 (a)-(l) show time charts of the major signals. Since they can be readily understood from the description for FIGS. 10 and 9, they are not explained here.

FIGS. 12A and 12B show coupling between transmission control units 200 and 300. The coupler in the transmission control unit 200 comprises AND circuits 280 and 282, a FF 284 and time delay circuits 286 and 288 (FIG. 12A). FIGS. 12B (a)-(k) show time charts of major signals. When CTS is issued to signals RTS and IRTS, the transmission control unit 200 discriminates the signal to RTS as CTS' and the signal to IRTS as ICTS. By separating ICTS and CTS', corresponding data can be sent out (for example, data ITXD for IRTS).

In accordance with the present embodiment, when IRTS is issued in addition to ordinary RTS, signal transmission to IRTS is carried out preferentially over RTS. In this manner, in case of emergency, preferential signal processing over ordinary signal processing can be carried out.

In the embodiment of FIG. 1B, the transmission line is also handled as the common unit. Alternatively, exclusive transmission lines 10 may be provided for the respective terminal devices, as shown in FIG. 13A. In this case, a coupling device 20 has an ability to check the occupancy of the CPU 15 by other terminal devices.

The priority levels of the terminal devices may be set by setting means 330 shown in FIG. 4 or they may be set by WRITE signals to a comparator 306 through data buses of the CPU as shown in FIG. 13B. In the latter case, the priority levels can be set on-line to any desired levels, although they must be set through the data buses of the CPU. In another method, only selected ones of the terminal devices may be coupled to the buses.

As shown in FIG. 13C, the preset values may be changed at a predetermined cycle by a preset value increment signal and WRITE signal to sequentially shift the preset values. In this case, the priority levels to the respective terminal devices are averaged but separate increment signal line and WRITE signal line must be provided.

FIG. 13D is applicable where the terminal devices are divided into groups of same priority levels and the priority levels are changed within each of the groups. In this case, however, like FIG. 13C, separate increment signal line and WRITE signal line are needed and low order priority level signal line is also needed.

We claim:

1. A signal transmission method for self-controlling priority among a plurality of distributed self-control apparatuses each connected to a common transmission time in a multidrop manner, wherein when request-to-send signals are provided from the apparatuses through said common transmission line, each of the apparatuses is allowed to use the common transmission line in turn in accordance with each priority level, comprising the steps of:

(a) assigning a priority time different from each other to a request-to-send (RTS) signal from each of the apparatuses, (b) assigning another time shorter than any one of the different priority times to an interrupt request-to-send (IRTS) signal from each of the apparatuses, the another time being the same in all of the apparatuses, (c) counting a clock signal to measure a first period wherein the transmission line is not used.

(d) granting a data transmission through the common transmission line from an apparatus when detecting a logical product signal obtained by ANDing the IRTS signal of the apparatus and a time coincidence detection signal issued when the value counted in the step (c) arrives at a predetermined value corresponding to the another time of the step (b), and if another IRTS signal from another apparatus is not issued, (e) granting a data transmission through the common transmission line from an apparatus in accordance with the order of the priority time assigned to the request-to-send (RTS) signal when a plurality of the IRTS signals are issued.

(f) granting a data transmission through the common transmission line from an apparatus in accordance with the order of the priority time assigned to the request-to-send (RTS) signal when none of the IRTS signals is issued, and (g) resetting the counted values counted in the step (c) in the other apparatuses in response to a data transmission signal from the granted apparatus.

2. A signal transmission method according to claim 1, further comprising the steps of:

counting a clock signal to measure a second period wherein none of the apparatuses issues a request-to-send signal, providing a forced synchronizing signal from one of the apparatuses when the value counted in the step (e) arrives at a predetermined value, and resetting the counted values counted in the step (c) in all of the apparatuses in response to the synchronizing signal for synchronization therebetween.

3. A signal transmission method according to claim 1, further comprising a step for changing the value corresponding to the priority time for each of the apparatuses to another value periodically.

4. A signal transmission system having a plurality of distributed self-control apparatuses each connected to a common transmission time in a multidrop manner, wherein when request-to-send signals are provided from said apparatuses through said common transmission line, each of said apparatuses is allowed to use said common transmission line in turn in accordance with each priority level, comprising:

first means for setting a priority time different from each other to a request-to-send (RTS) signal from each of said apparatuses, second means for setting another time shorter than any one of said different priority times to an interrupt request-to-send (IRTS) signal from each of said apparatuses, to another time being the same for all of said apparatuses, means for counting a clock signal to measure a first period wherein said transmission line is not used, means for granting a data transmission through said common transmission line from an apparatus when detecting a logical product signal obtained by ANDing the IRTS signal of said apparatus and a time coincidence detection signal issued when the value counted by said counting means arrives at a predetermined value corresponding to said another time by said second setting means, and if another IRTS signal from another apparatus is not issued, means for granting a data transmission through said common transmission line from an apparatus in accordance with the order of said priority time set for said request-to-send (RTS) signal when a plurality of said IRTS signals are issued, means for granting a data transmission through said common transmission line from an apparatus in accordance with the order of said priority time set for said request-to-send (RTS) signal when none of said IRTS signals is issued, and means for resetting said counted values counted by said counting means in said other apparatuses in response to a data transmission signal from said granted apparatus.

5. A signal transmission system according to claim 4, further comprising issuing means for issuing the IRTS signal in addition to the request-to-send signal in preference thereto when a priority interruption access request is set in said issuing means.

6. A signal transmission system according to claim 4, wherein said counting means receives both a signal obtained from a connection means between said apparatus and said common transmission line and indicating the use of said common transmission line, and a signal transmitted from said according to said common transmission line.

7. A signal transmission system according to claim 6, wherein said counting means includes two operational amplifiers for inputting said signal from said connection means and outputting a logical OR signal for said signals.

8. A signal transmission system according to claim 7, further comprising:

additional counting means for measuring a time period wherein said logical OR signal is at zero, and forced-synchronization signal issuing means for sending a forced synchronizing signal from said apparatus to said common transmission line when said additional counting means measures a predetermined time period.

9. A signal transmission system according to claim 4, further comprising priority shift means for changing priority times set in said apparatuses periodically.

* * * * *